US012706424B2

(12) United States Patent
Ashcroft et al.

(10) Patent No.: US 12,706,424 B2
(45) **Date of Patent: *Aug. 11, 2026**

(54) LIQUID DETECTION AND CORROSION MITIGATION

(71) Applicant: Apple Inc., Cupertino, CA (US)

(72) Inventors: Tavys Q. Ashcroft, San Jose, CA (US); Robert Scritzky, Sunnyvale, CA (US); Daibo Chen, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 18/141,907

(22) Filed: May 1, 2023

(65) Prior Publication Data

US 2023/0352886 A1 Nov. 2, 2023

Related U.S. Application Data

(63) Continuation of application No. 17/229,660, filed on Apr. 13, 2021, now Pat. No. 11,658,443.

(51) Int. Cl.

*H01R 13/66* (2006.01)
*H01R 12/72* (2011.01)
*H01R 13/52* (2006.01)

(52) U.S. Cl.

CPC ....... *H01R 13/6683* (2013.01); *H01R 12/727* (2013.01); *H01R 13/5227* (2013.01)

(58) Field of Classification Search

CPC .............. H01R 13/6683; H01R 12/727; H01R 13/5227; G01M 3/16; G01N 27/048;

(Continued)

(56) References Cited

U.S. PATENT DOCUMENTS

| | | | |
|---|---|---|---|
| 3,927,351 A | 12/1975 | Lambertsen | |
| 4,232,262 A | 11/1980 | Emo et al. | |

(Continued)

FOREIGN PATENT DOCUMENTS

| | | | |
|---|---|---|---|
| CN | 1488509 A | 4/2004 | |
| CN | 101636660 A | 1/2010 | |

(Continued)

OTHER PUBLICATIONS

"Basics of Electrochemical Impedance Spectroscopy", Gamry Instruments, Application Note Tutorial, Available online at: <URL: llttps:i/ www"gamry.com/applicationnotesiElSibasics-of~electmchernica!~impedance~spectroscopy/>, Nov. 9, 2016, 19 pages.

(Continued)

*Primary Examiner* — Renee S Luebke
*Assistant Examiner* — Paul D Baillargeon
(74) *Attorney, Agent, or Firm* — Kilpatrick Townsend & Stockton LLP

(57) ABSTRACT

Methods, structures, and apparatus that are able to detect the presence of liquid, moisture, or other contaminants in or on a connector. Examples provide a connector having a dedicated liquid-detect contact that does not have a corresponding contact in a corresponding connector. Examples provide liquid-detect circuitry that can use the liquid-detect contact to determine the presence of a liquid on or in the connector and can perform self-diagnostic tests such as continuity checks and calibration.

19 Claims, 10 Drawing Sheets

(58) Field of Classification Search
CPC .... G01R 31/66; G01R 1/0416; G01R 1/0408; G01R 31/2805; G01R 31/2818; H05K 1/117
USPC ............. 439/190, 205, 206; 324/756.05, 538
See application file for complete search history.

(56) References Cited

U.S. PATENT DOCUMENTS

| | | | |
|---|---|---|---|
| 5,097,213 | A | 3/1992 | Hunting et al. |
| 5,440,263 | A | 8/1995 | Fournel et al. |
| 6,313,646 | B1 | 11/2001 | Davis et al. |
| 6,318,172 | B1 | 11/2001 | Byatt et al. |
| 6,885,201 | B2 | 4/2005 | Germiquet et al. |
| 7,571,637 | B2 | 8/2009 | Chen et al. |
| 8,107,209 | B2 | 1/2012 | Simon |
| 8,708,745 | B2 | 4/2014 | Golko et al. |
| 8,886,971 | B2 | 11/2014 | Chuang |
| 8,913,771 | B2 | 12/2014 | Filson et al. |
| 9,146,888 | B2 | 9/2015 | Terlizzi et al. |
| 9,157,880 | B2 * | 10/2015 | Stevens .................. H02H 5/083 |
| 9,300,773 | B2 | 3/2016 | Mittleman et al. |
| 9,335,355 | B2 | 5/2016 | Menzel et al. |
| 9,535,117 | B2 | 1/2017 | Menon et al. |
| 9,992,863 | B2 * | 6/2018 | Amini ....................... B23C 3/12 |
| 10,114,781 | B2 | 10/2018 | Whitby-strevens et al. |
| 10,184,909 | B2 | 1/2019 | Gupta et al. |
| 10,236,683 | B2 | 3/2019 | Bacon et al. |
| 10,591,430 | B2 | 3/2020 | Jol et al. |
| 11,658,443 | B2 | 5/2023 | Ashcroft et al. |
| 2005/0265009 | A1 | 12/2005 | Fussinger et al. |
| 2006/0058069 | A1 | 3/2006 | Garcia et al. |
| 2006/0208914 | A1 | 9/2006 | Liu et al. |
| 2008/0165460 | A1 | 7/2008 | Whitby-Strevens |
| 2010/0165528 | A1 | 7/2010 | Chan |
| 2011/0104940 | A1 | 5/2011 | Rabu et al. |
| 2012/0299555 | A1 | 11/2012 | Tam et al. |
| 2014/0181328 | A1 | 6/2014 | Terlizzi et al. |
| 2014/0191588 | A1 | 7/2014 | Stevens |
| 2014/0253150 | A1 | 9/2014 | Menzel et al. |
| 2015/0049407 | A1 | 2/2015 | Tanimoto et al. |
| 2015/0162684 | A1 | 6/2015 | Amini et al. |
| 2015/0208154 | A1 | 7/2015 | Turner |
| 2016/0080553 | A1 | 3/2016 | Dempster et al. |
| 2016/0154047 | A1 | 6/2016 | Alcouffe et al. |
| 2016/0190794 | A1 | 6/2016 | Forghani-Zadeh et al. |
| 2016/0313270 | A1 | 10/2016 | Connell et al. |
| 2017/0110835 | A1 | 4/2017 | Hasegawa et al. |
| 2017/0344508 | A1 | 11/2017 | Setiawan et al. |
| 2017/0358922 | A1 | 12/2017 | Bacon et al. |
| 2019/0079037 | A1 | 3/2019 | Jol et al. |
| 2019/0288465 | A1 * | 9/2019 | Little ..................... H01R 24/60 |
| 2020/0259298 | A1 | 8/2020 | Tyrrell et al. |
| 2020/0319675 | A1 | 10/2020 | Beckham et al. |

FOREIGN PATENT DOCUMENTS

| | | | |
|---|---|---|---|
| CN | 102265449 | A | 11/2011 |
| CN | 203983639 | U * | 12/2014 |
| CN | 105301659 | A | 2/2016 |
| CN | 208062368 | U | 11/2018 |
| CN | 111366316 | A | 7/2020 |
| CN | 111918160 | A | 11/2020 |
| EP | 2390673 | A2 | 11/2011 |
| EP | 2680043 | A2 | 1/2014 |
| JP | 2004235724 | A | 8/2004 |
| JP | 2010073405 | A | 4/2010 |
| WO | 2013007542 | A1 | 1/2013 |

OTHER PUBLICATIONS

"Electrochemical Impedence Spectroscopy EIS", Clean Energy Wiki, University of Washington Clean Energy Institute, Available Online at: http://cleanenergywiki.org/index.php?title=Electrochemical_Impedence_Spectroscopy_EIS, 2019, 6 pages.
"Universal Serial Bus Type-C Cable and Connector Specification", Revision 1.0, USB 3.0 Promoter Group, Aug. 11, 2014, 171 pages.
"Universal Serial Bus Type-C Cable and Connector Specification", Revision 1.2, USB 3.0 Promoter Group, Mar. 25, 2016, 221 pages.
"Universal Serial Bus Type-C Cable and Connector Specification", Revision 1.2, USB 3.0 Promoter Group, Mar. 25, 2016, 248 pages.
British Patent Application No. 2205517.2 , "Combined Search and Examination Report", Sep. 21, 2022, 10 pages.
Hamdy et al., "Electrochemical Impedance Spectroscopy Study of the Corrosion Behavior of Some Niobium Bearing Stainless Steels in 3.5% NaCl", Int. J. Electrochem. Sci., vol. 1, 2006, pp. 171-180.
Reece , "An Introduction to Electrochemical Impedance Spectroscopy (EIS)", Available online at: <URL:https:!/www.jlab.org/conferences!tfsrf/Thursday/Th2_•1-EIS%20intm%20Reece.pdf, 2005, 11 pages.
Chinese Patent Application No. 202210384797.4 , "Notice of Decision to Grant", Sep. 6, 2023, 5 pages.

* cited by examiner

LIQUID DETECTION AND CORROSION MITIGATION

CROSS REFERENCES TO RELATED APPLICATIONS

This application is a continuation of U.S. patent application Ser. No. 17/229,660, filed Apr. 13, 2021, which is incorporated by reference.

BACKGROUND

The amount of data transferred between electronic devices has grown tremendously the last several years. Large amounts of audio, streaming video, text, and other types of data content are now regularly transferred among desktop and portable computers, media devices, smart phones, displays, storage devices, and other types of electronic devices.

Power and data can be provided from one electronic device to another over cables that can include one or more wire conductors, fiber optic cables, or other conductors. Connector inserts can be located at each end of these cables and can be inserted into connector receptacles in the communicating or power transferring electronic devices. Contacts in or on a connector insert can form electrical connections with corresponding contacts in a connector receptacle. Other devices can have contacts at a surface of a device. Pathways for power and data can be formed when devices are attached together or positioned next to each other and corresponding contacts are electrically connected to each other.

The various contacts in connector inserts, in connector receptacles, or on a surface of a device, can be exposed to the local environment where they can encounter liquid, moisture, or other damaging contaminants. For example, liquids can be spilled on these contacts or a device can be set down such that its contacts land in a puddle of liquid. Users can swim or exercise while wearing or holding an electric device. These activities can put contacts for the electronic devices in a position to encounter various contaminants such as chlorinated water, sweat, or other moisture.

These liquids, moisture, or other contaminants can corrode and damage the contacts. This corrosion can be greatly exacerbated by the presence of an electric potential, such as when a voltage is applied to a contact. Accordingly, it can be desirable for a device to be able to detect the presence of moisture or other contaminant at a contact so that the possible damage can be mitigated.

Thus, what is needed are methods, structures, and apparatus that can detect the presence of liquids, moisture, or other contamination at a contact of a connector.

SUMMARY

Accordingly, embodiments of the present invention can provide methods, structures, and apparatus that can detect the presence of liquid, moisture, or other contamination at a contact of a connector. An illustrative embodiment of the present invention can provide a connector having contacts to mate with corresponding contacts in a corresponding connector. The connector can include an additional contact that does not have a corresponding contact in the corresponding connector. The additional contact can be used to detect the presence of moisture in the connector and can be referred to as a liquid-detect contact. More than one additional contact can be included, for example, a liquid-detect contact can be located on each of a top and bottom side of a connector feature, such as a tongue. The connector can be a connector receptacle while the corresponding connector can be a connector insert. Alternatively, the connector can be a connector insert while the corresponding connector can be a connector receptacle.

In these and other embodiments of the present invention, the presence of liquid, moisture, or other contamination (referred to here as liquid for simplicity) can be detected by generating a stimulus voltage signal and applying the stimulus voltage signal (or a voltage signal that tracks the stimulus voltage signal) though an impedance to the liquid-detect contact. A voltage signal at the liquid-detect contact can be determined and referred to as the applied voltage signal. Alternatively, instead of determining the applied voltage signal directly, a voltage proportional to the applied voltage signal at the liquid-detect contact, an inverse of the applied voltage signal at the liquid-detect contact, or a voltage proportional to the inverse of the applied voltage signal at the liquid-detect contact can be determined and referred to as the measured voltage signal. In this way, the measured voltage signal can directly track and be used as a proxy for the actual applied voltage signal at the liquid-detect contact. A current through the impedance can be determined and referred to as the resulting current.

In these and other embodiments of the present invention, the stimulus voltage signal can be a sinewave, for example a low-frequency sinewave. The stimulus voltage signal can be generated using pulse-density modulation (PDM) and filtering to achieve a desired spectral purity. The stimulus voltage can alternatively be generated using a digital-to-analog converter (DAC) along with filtering to achieve the desired spectral purity. The stimulus voltage signal can be provided to a transimpedance amplifier. The transimpedance amplifier can generate a voltage signal that tracks or follows the stimulus voltage signal and can apply that tracking voltage signal through an impedance to the liquid-detect contact. A resulting current can flow through an input resistor and a feedback resistor of the transimpedance amplifier, thus generating a measured voltage signal. The measured voltage signal can be the inverse of the voltage at the liquid-detect contact or a voltage proportional to the inverse of the voltage at the liquid-detect contact. The stimulus voltage signal and the measured voltage signal can be digitized using an analog-to-digital converter (ADC.) The stimulus voltage signal and the measured voltage signal can be used to determine the presence of liquid at the liquid-detect contact. For example, an impedance at the liquid-detect contact can be found using the amplitudes and relative phases of the stimulus voltage signal and the measured voltage signal. The magnitude and phase of the determined impedance can then be used to determine the presence of liquid at the liquid-detect contact.

In these and other embodiments of the present invention, the stimulus voltage signal can be a series of pulses. As before, a stimulus voltage signal can be provided to a transimpedance amplifier. The transimpedance amplifier can generate a voltage signal that tracks or follows the stimulus voltage signal and can apply that tracking voltage signal through an impedance to the liquid-detect contact. A resulting current can flow through an input resistor and a feedback resistor of the transimpedance amplifier, thus generating a measured voltage signal. The measured voltage signal can be the inverse of the voltage at the liquid-detect contact or a voltage proportional to the inverse of the voltage at the liquid-detect contact. The stimulus voltage signal and the measured voltage signal can be digitized using an analog-to-digital converter (ADC.) An impedance at the liquid-detect contact can be found by determining the high-frequency roll-off of the measured voltage signal, as well as the initial overshoot, the settled amplitude, and the undershoot of the measured voltage signal.

In these and other embodiments of the present invention, the liquid-detect contact can be implemented in various ways. For example, the liquid-detect contact can be implemented on a tongue in a connector receptacle, such as a Universal Serial Bus Type-C connector receptacle. The tongue can be formed of a printed circuit board, where contacts (or contacting portions of contacts), including the liquid-detect contact, can be formed as pads on surfaces of the printed circuit boards. The printed circuit board can be supported by a metal frame. The liquid-detect contact can be positioned where it might make only incidental contact with ground contacts or other contacts during mating with a corresponding connector insert. The liquid-detect contact can be positioned where it does not connect to any contact in the corresponding connector insert when mated. For example, the liquid-detect contact can be positioned between signal (and power) contacts and a ground pad on the tongue. Liquids that form a current path between the liquid-detect contact and another contact, such as a power supply contact or connection-detect contact, can be detected.

In these and other embodiments of the present invention, the tongue can be formed of plastic molding. The plastic molding can be supported by a metallic frame. The tongue can further include a liquid-detect contact formed as center plate between contacts on a top side of the tongue and contacts on the bottom surface of the tongue. The molding can include passages from a top surface of the tongue to the liquid-detect contact, as well as passages from the bottom surface of the tongue to the liquid-detect contact. The passages can be near or adjacent to contacts, such as signal and power contacts, on the tongue. Liquids that form a current path between the liquid-detect contact and another contact, such as a power supply contact or connection-detect contact, can be detected.

In these and other embodiments of the present invention, various mitigation strategies can be taken in response to the detection of a liquid in or on a connector. For example, a user can be alerted that liquid is present and that the device housing the connector should be powered down. A user can be alerted that the device is powering down and then the device can power down. The device can power down following the detection of the presence of liquid. Liquid ejection or cleaning techniques can be undertaken by the device or suggested to the user. Circuitry connected to one or more contacts of the connector can be disconnected.

In these and other embodiments of the present invention, it can be desirable to be able to detect the presence of an open or disconnect in the circuitry connected to a liquid-detect contact. Such an open or disconnect can provide a similar result as a liquid-free environment, thereby possibly giving a false-negative result. Accordingly, a loopback path for a loopback test can be provided. During loopback testing, the stimulus voltage signal (or a tracking voltage signal that follows the stimulus voltage signal) can be applied through an impedance to a first end or portion of the liquid-detect contact. A second end or portion of the liquid-detect contact can be connected to a loopback reference resistor. The detection of the loopback reference resistor can inform the system that a continuous path to and through the liquid-detect contact is present.

In these and other embodiments of the present invention, it can be desirable to be able to calibrate the liquid-detect circuitry. Accordingly, a calibration reference resistor having a known value can be provided. During calibration, the stimulus voltage signal (or a tracking voltage signal that follows the stimulus voltage signal) can be applied through an impedance to the calibration reference resistor. A measured resistance can be determined and compared to the expected value of the calibration reference resistor. The results of the comparison can be used to calibrate the liquid-detect circuitry.

In these and other embodiments of the present invention, it can be desirable to be able to protect the liquid-detect circuitry and associated circuits from high voltages caused by liquids in or on the connector. Accordingly, overvoltage circuits can be included and connected to the liquid-detect contact. These overvoltage circuits can control multiplexers connected to the liquid-detect contact. When an overvoltage condition is detected, the multiplexers can be switched to disconnect the liquid-detect circuitry from the liquid-detect contact. The multiplexers can further be connected to other circuit nodes or open circuits when an overvoltage condition is detected.

The presence of moisture, particularly in combination with the presence of an electric filed, can greatly accelerate the growth of dendrites between contacts. These dendrites can form conductive paths between contacts that can severely hamper the operation of circuits connected to the contacts. Also, a tongue of a connector can be formed of a printed circuit board supported by a metal frame. During insertion an extraction of a corresponding connector, metal fragments from the metal frame—as well as other conductive particulate matter—can accumulate around the liquid-detect contact. This can form or help to form—along with these dendrites—current paths from the liquid-detect contact. Accordingly, one or more raised surfaces formed of solder mask, glass deposition, or other layer can be positioned around the liquid-detect contact and one or more nearby contacts. The raised surfaces can help to prevent the buildup of dendrites and conductive matter around the liquid-detect contact, thereby helping to prevent the formation of current paths between contacts.

Embodiments of the present invention can provide liquid detection for various types of devices, such as portable computing devices, tablet computers, desktop computers, laptops, all-in-one computers, audio devices, wearable computing devices, cell phones, smart phones, media phones, storage devices, portable media players, navigation systems, monitors, power supplies, video delivery systems, adapters, remote control devices, chargers, and other devices. The liquid detection can be used in various connectors. These connectors can provide pathways for power and signals that are compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, Lightning®, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
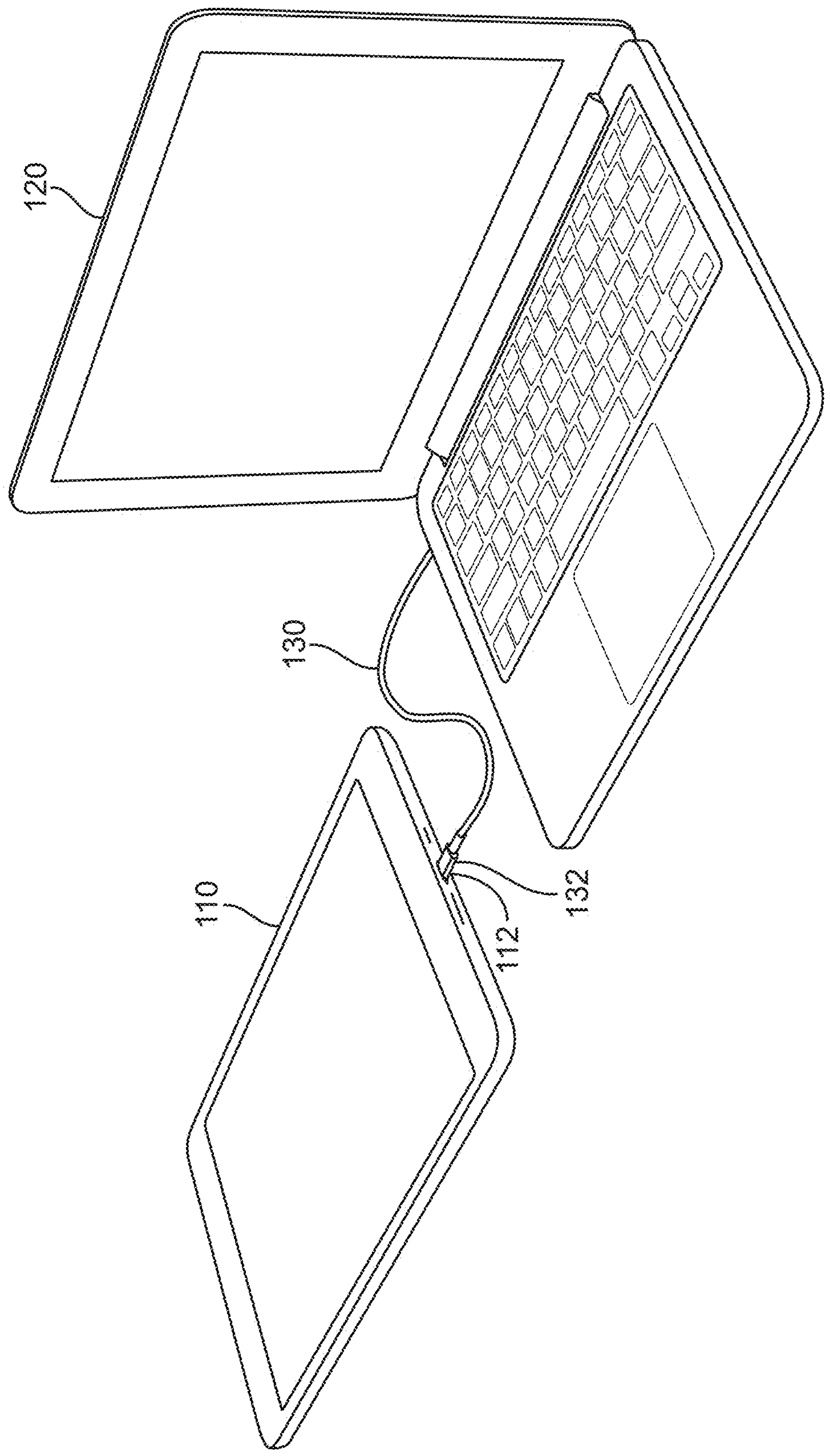
FIG. 1 illustrates an electronic system that can be improved by the incorporation of an embodiment of the present invention.

FIG. 1 illustrates an electronic system that can be improved by the incorporation of an embodiment of the present invention. This figure, as with the other included figures, is shown for illustrative purposes and does not limit either the possible embodiments of the present invention or the claims.

In this example, first electronic device 110 can be in communication with second electronic device 120 over a cable 130. Specifically, connector insert 132 on cable 130 can be inserted into connector receptacle 112 on first electronic device 110, while a second connector insert (not shown) can be inserted into a second connector receptacle (not shown) on second electronic device 120. First electronic device 110 and second electronic device 120 can communicate by sending data to each other over cable 130. First electronic device 110 and second electronic device 120 can share power over cable 130 as well.

Contacts 220 (shown in FIG. 2) in connector receptacle 112 of first electronic device 110 and contacts (not shown) in connector insert 132 can be exposed to liquids, moisture, or other contaminants (again, collectively referred to as liquids.) These can corrode contacts 220 and contacts (not shown) in connector insert 132. Accordingly, it can be desirable to be able to detect the presence liquid in connector receptacle 112 or connector insert 132. Once the presence of a liquid is detected, mitigating steps can be performed by first electronic device 110 or suggested to a user.

Figure 2:
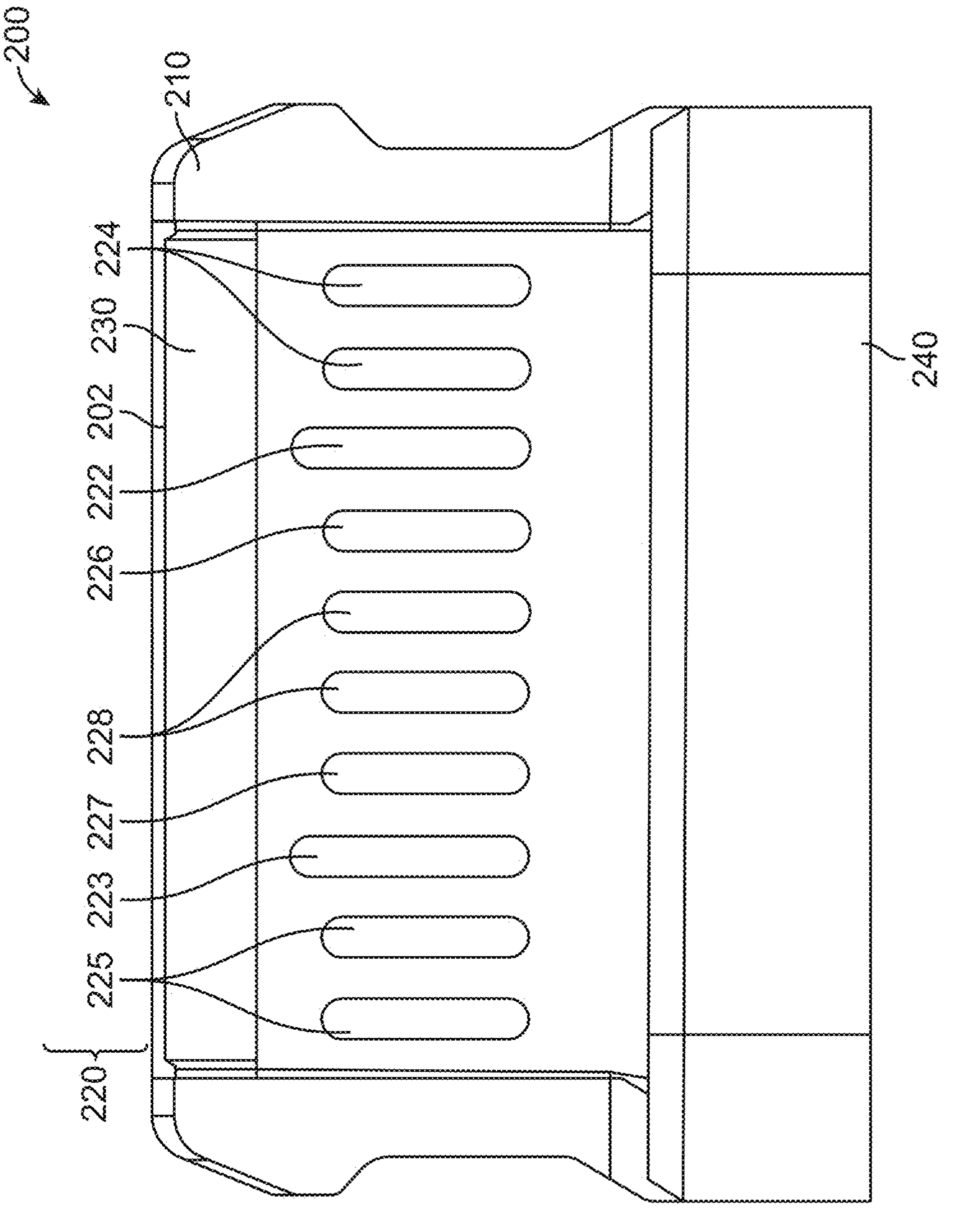
FIG. 2 illustrates a tongue of a connector receptacle that can be improved by an embodiment of the present invention.

FIG. 2 illustrates a tongue of a connector receptacle that can be improved by an embodiment of the present invention. Tongue 200 can include frame 210 supporting printed circuit board 230. Tongue 200 can include a leading edge 202 and an electromagnetic interference (EMI) shield or ground pad 240. A number of contacts 220 can be located on tongue 200 between leading edge 202, frame 210, and ground pad 240. Contacts 220 can include power supply or VBUS contact 222 and VBUS contact 223, transmit differential-pair contacts 224 and receive differential-pair contacts 225, connection-detect contact 226, sideband use contact 227, and USB contacts 228, in accordance with the USB Type-C specification. Frame 210 can serve as a ground contacts on each side of tongue 200. Contacts 220 on the top surface of tongue 200 can be repeated on a bottom surface of tongue 200, again in accordance with the USB Type-C specification.

Contacts 220 (or contacting portions of contacts 220) can be plated on printed circuit board 230. When a liquid is present on tongue 200, one or more contacts 220 can become damaged. This damage can be caused by be liquid causing electrical shorts among two or more of contacts 220, frame 210, or ground pad 240. This damage can be exacerbated when it occurs between contacts at different voltage potentials. For example, liquid between VBUS contact 222 and connection-detect contact 226 can cause high currents to flow, thereby causing damage. Similarly, liquid between VBUS contact 222 and ground pad 240 can cause high currents to flow, again causing damage. Additionally, such liquids, particularly in the presence of a voltage potential, can greatly accelerate the formation of dendritic growth between these contacts. This dendritic growth can either increase the likelihood of electrical shorts between these contacts or cause permanent electrical shorts, thereby reducing or eliminating the functionality of connector receptacle 112 (shown in FIG. 1.)

Figure 3:
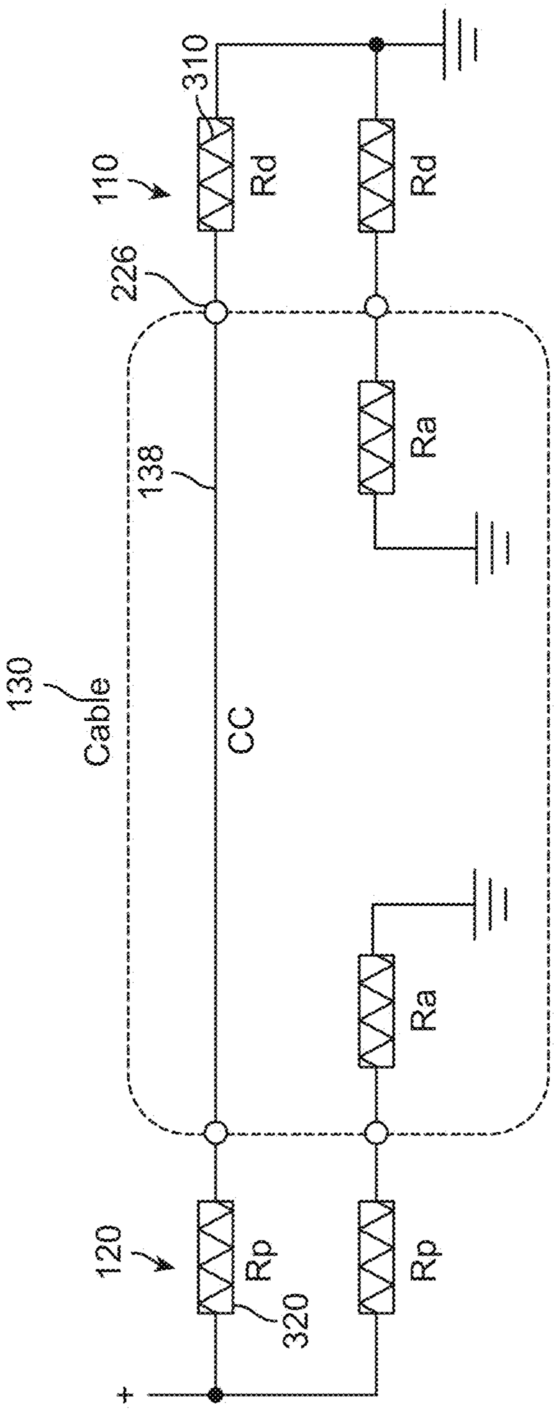
FIG. 3 illustrates connection detect circuitry that can be improved by the incorporation of an embodiment of the present invention.

FIG. 3 illustrates connection detect circuitry that can be improved by the incorporation of an embodiment of the present invention. As in FIG. 1, first electronic device 110 can be connected to second electronic device 120 through cable 130. First electronic device 110 can include connection-detect contact 226 (referred to as a CC contact.) Connection-detect contact 226 can be connected through pull-down resistor 310 to ground, thereby indicating that first electronic device 110 is, or is configured as, a power-sink device. Connection-detect contact 226 can be connected to a corresponding contact in second electronic device 120 through conduit 138 in cable 130, which can be connected to pull-up resistor 320 in second electronic device 120. Pull-up resistor 320 can indicate that second electronic device 120 is, or is configured as, a power-source device. VBUS contact 222 (shown in FIG. 2) can be adjacent to connection-detect contact 226. The presence of a liquid between these contacts can cause current to flow from VBUS contact 222 to connection-detect contact 226. This presence of a liquid can cause dendritic growth between VBUS contact 222 and connection-detect contact 226.

Again, it can be desirable to be able to determine the presence of liquids between these and other contacts. More generally, it can be desirable to be able to determine the presence of liquid on or in a connector receptacle or connector insert. Examples of connector tongues with this capacity are shown in the following figures. While these examples are shown as being implemented on connector tongues, embodiments of the present invention can be employed on other portions of connector inserts and connector receptacles.

Figure 4:
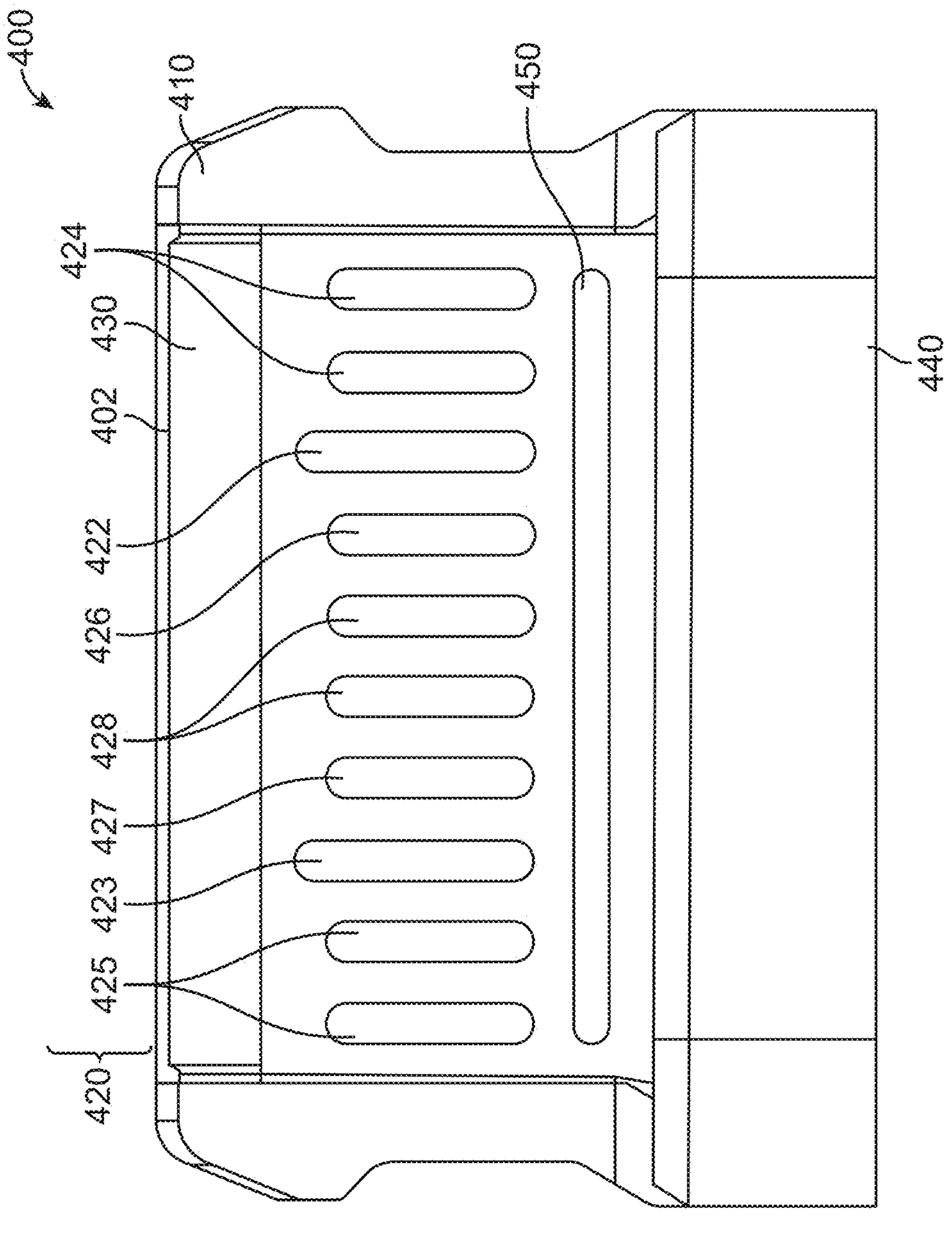
FIG. 4 illustrates a connector tongue according to an embodiment of the present invention.

FIG. 4 illustrates a connector tongue according to an embodiment of the present invention. Tongue 400 can be used in connector receptacle 112 (shown in FIG. 1), or in other connector receptacles or connector inserts according to embodiments of the present invention. Tongue 400 can include printed circuit board 430. Printed circuit board 430 can be supported by frame 410. Tongue 400 can include leading edge 402. Tongue 400 can further include EMI shield or ground pad 440. Printed circuit board 430 can support contacts 420. Contacts 420 can include power supply or VBUS contact 422 and VBUS contact 423, transmit differential-pair contacts 424 and receive differential-pair contacts 425, connection-detect contact 426, sideband use (SBU) contact 427, and USB contacts 428, in accordance with the USB Type-C specification. Frame 410 can serve as a ground contacts on each side of tongue 400. Contacts 420 on the top surface of tongue 400 can be repeated on a bottom surface of tongue 400, again in accordance with the USB Type-C specification.

Tongue 400 can further include liquid-detect contact 450. A corresponding liquid-detect contact (not shown) can be located on an opposing side of tongue 400. Liquid-detect contact 450 can be positioned in such a way that connections to contacts in the corresponding connector insert 132 (shown in FIG. 1) are limited to transient and incidental encounters. During liquid detection mode, liquid-detect contact 450 can convey an applied voltage signal. When a liquid is present on liquid-detect contacts 450, the presence of the applied voltage signal can cause a current to flow through liquid-detect contact 450. If liquid is solely present on liquid-detect contact 450, small charging currents can flow into the liquid itself. When liquid is present between liquid-detect contact 450 and a second contact, such as VBUS contact 422 or ground pad 440, larger currents can flow. These currents can thus be used to determine the presence of a liquid on tongue 400. The magnitude and phase relationship of currents flowing through liquid-detect contact 450 can provide information regarding the nature and extent of the liquid. Further details are shown below in FIG. 9 in FIG. 10.

In these and other embodiments of the present invention, liquid-detect contact 450 might not have a corresponding contact in corresponding connector insert 132 (shown in FIG. 1.) In these and other embodiments of the present invention, liquid-detect contact 450 can have a corresponding contact in connector insert 132. This can enable liquid-detect circuitry, such as liquid-detect circuitry 1000 shown in FIG. 10 below, to be able to detect the presence of moisture in connector insert 132 even in the absence of moisture in connector receptacle 112 itself. In these and other embodiments of the present invention, the functionality of one or more contacts 420 can be multiplexed in time or frequency with the function of liquid-detect contact 450, thereby allowing the removal or repurposing (either temporarily or permanently) of liquid-detect contact 450.

Figure 5:
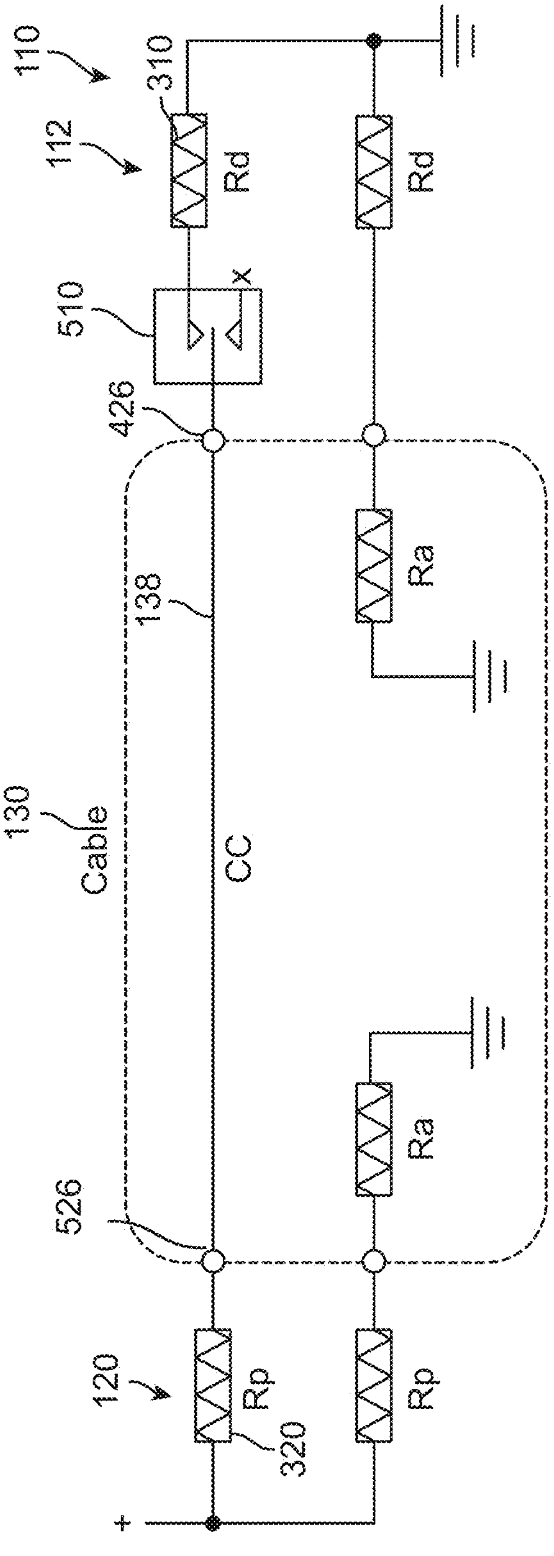
FIG. 5 illustrates a portion of a connection detect circuit according to an embodiment of the present invention.

FIG. 5 illustrates a portion of a connection detect circuit according to an embodiment of the present invention. In this example, first electronic device 110 can connect to second electronic device 120 through cable 130. Connection-detect contact 426 can be connected through pulldown resistor 310 to ground. Alternatively, connection-detect contact 426 can be disconnected from pulldown resistor 310 by multiplexer 510, for example when liquid is detected in connector receptacle 112 of first electronic device 110. Connection-detect contact 426 can be connected to a corresponding connection-detect contact 526 and pull-up resistor 320 in second electronic device 120 through conduit 138. In these and other embodiments of the present invention, a multiplexer (not shown) that is the same as or similar to multiplexer 510 can be used to disconnect pull-up resistor 320 from connection-detect contact 526 in second electronic device 120 when liquid is detected in the connector receptacle (not shown) of second electronic device 120.

In these and other embodiments of the present invention, it can be desirable to disconnect connection-detect contact 426 from circuitry internal to first electronic device 110. This disconnection can reduce or eliminate the electric field or potential between connection-detect contact 426 and adjoining or nearby contacts. This disconnection can reduce or prevent undesired current flow through a liquid from a nearby or adjoining contact. For example, disconnecting connection-detect contact 426 from pulldown resistor 310 can help to eliminate or reduce an undesired current flow from VBUS contact 422 to connection-detect contact 426. This disconnection can also prevent second electronic device 120 from attempting to charge first electronic device 110, again reducing current flow and electric fields and potentials.

Again, liquid in connector receptacle 112 (shown in FIG. 1) can cause dendritic growth between and among contacts 420, liquid-detect contact 460, and ground pad 440. Also, in these and other embodiments of the present invention, frame 410 can be formed of metal, such as titanium. Frame 410 can be manufactured using metal injection molding or other manufacturing techniques. As connector insert 132 (shown in FIG. 1) is repetitively inserted and withdrawn from connector receptacle 112, portions of frame 410 can become scraped, thereby creating small grains or pieces of conductive material. These and other pieces of particulate matter, including conductive material, can accumulate in one or more areas on a surface of tongue 400. For example, this conductive material can accumulate among contacts 420, between contacts 420 and liquid-detect contact 450, or between liquid-detect contact 450 and ground pad 440. In order to prevent or reduce dendritic growth as well as this accumulation of conductive material, embodiments of the present invention can include one or more protective structures. An example is shown in the following figure.

Figure 6:
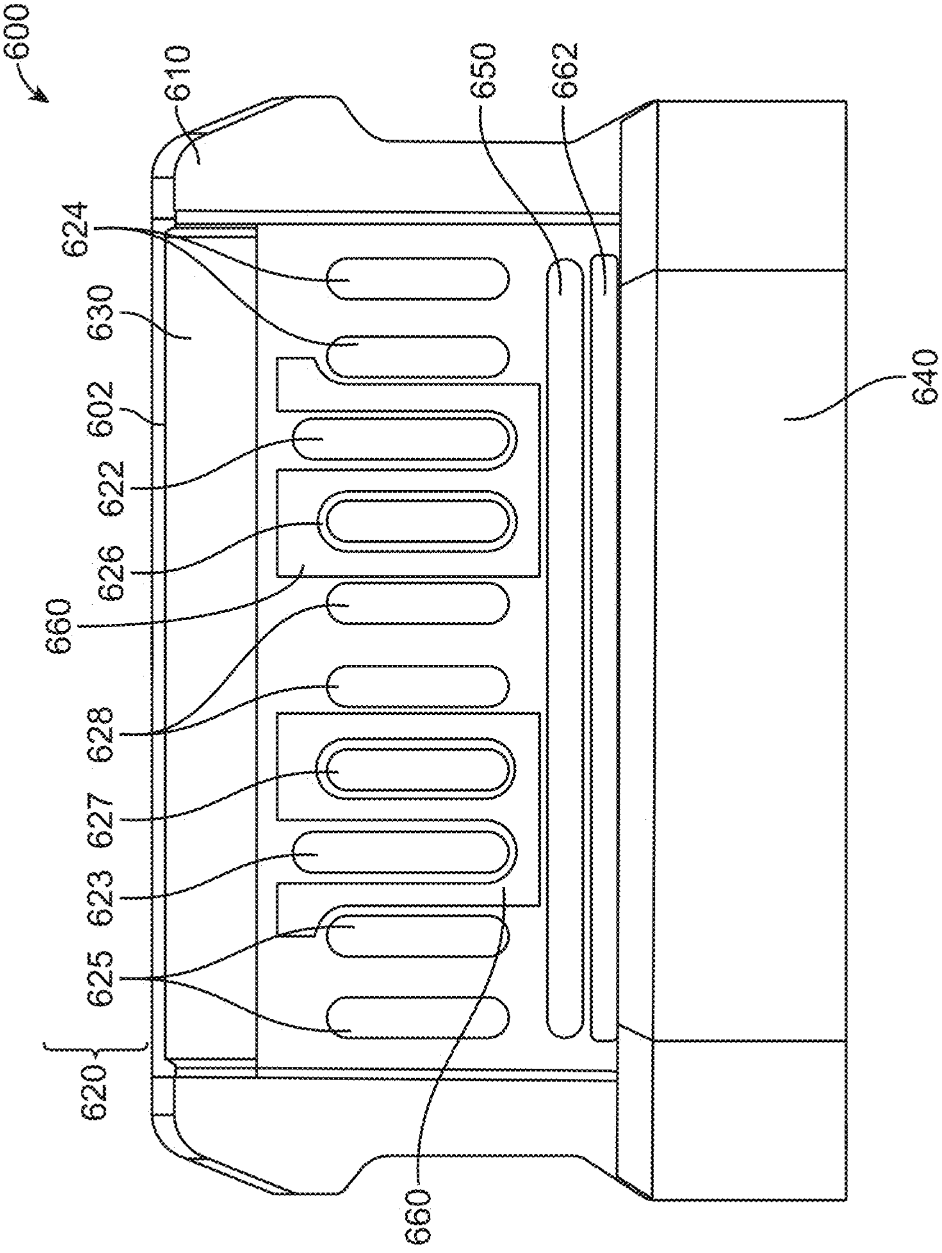
FIG. 6 illustrates a connector tongue according to an embodiment of the present invention.

FIG. 6 illustrates a connector tongue according to an embodiment of the present invention. Tongue 600 can be utilized in connector receptacle 112 (shown in FIG. 1), or in other connector receptacles or connector inserts according to embodiments of the present invention. Tongue 600 can include printed circuit board 630. Printed circuit board 630 can be supported by frame 610. Tongue 600 can include leading edge 602. Printed circuit board 630 can support contacts 620. Contacts 620 can include power supply or VBUS contact 622 and VBUS contact 623, transmit differential-pair contacts 624 and receive differential-pair contacts 625, connection-detect contact 626, sideband use contact 627, and USB contacts 628 in accordance with the USB Type-C specification. Frame 610 can serve as a ground contacts on each side of tongue 600. Contacts 620 on the top surface of tongue 600 can be repeated on a bottom surface of tongue 600, again in accordance with the USB Type-C specification. As before, a liquid-detect contact, liquid-detect contact 650, can be included. Liquid-detect contact 650 can be positioned between contacts 620 and ground pad 640. A corresponding liquid-detect contact (not shown) can be located on an opposing side of tongue 600.

Again, dendritic growth can occur between and among contacts 620, between contacts 620 and liquid-detect contact 650, between liquid-detect contact 650 and ground pad 640, or elsewhere on or near tongue 600. Additionally, conductive material can accumulate in these areas. Accordingly, dams or raised surfaces 660 can be located around one or more contacts 620. For example, raised surfaces 660 can be located around VBUS contact 622 and connection-detect contact 626. Raised surfaces 660 can help to prevent dendritic growth and accumulation of conductive material between VBUS contact 632 and connection-detect contact 626. Raised surfaces 660 can further help to prevent dendritic growth and the accumulation of conductive material between VBUS contact 622 and liquid-detect contact 650, as well as between connection-detect contact 626 and liquid-detect contact 650. Raised surface 662 can be positioned between liquid-detect contact 650 and ground pad 640. Raised surface 662 can similarly help to prevent dendritic growth and the accumulation of conductive material between liquid-detect contact 650 and ground pad 640.

Raised surfaces 660 and raised surface 662 can be formed in various ways. For example, raised surfaces 660 and raised surface 662 can be formed of a solder mask, glass deposition, or other layer. Alternatively, raised surfaces 660 and raised surface 662 can be recessed surfaces. One or more of raised surfaces 660 and raised surface 662 can be located on an opposing side (not shown) of tongue 600.

In the above examples of the present invention, tongue 400 and tongue 600 can be formed of a printed circuit board surrounded by a metallic frame. In these and other embodiments of the present invention, tongues can be formed in various ways. For example, a tongue can be formed of a molded portion. This molded portion can be supported by a frame. This frame can be a metallic frame. Also, in the example of FIG. 4, liquid-detect contact 450 can be positioned in such a way that connections to contacts in the corresponding connector inserts 132 (shown in FIG. 1) are limited to transient and incidental encounters. In these and other embodiments of the present invention, a liquid-detect contact can be located in different positions. An example is shown in the following figure.

Figure 7A:
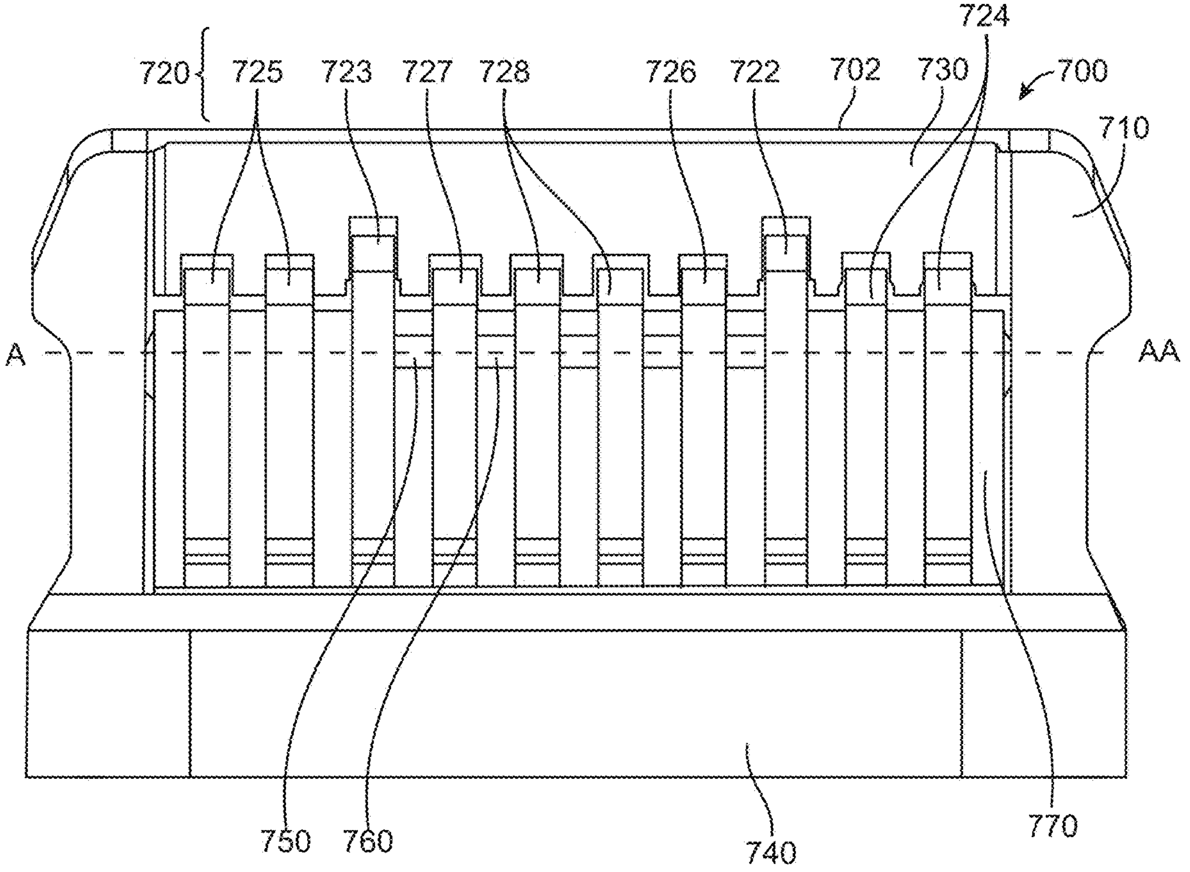
FIG. 7A and FIG. 7B illustrate a connector tongue according to an embodiment of the present invention.
Figure 7B:
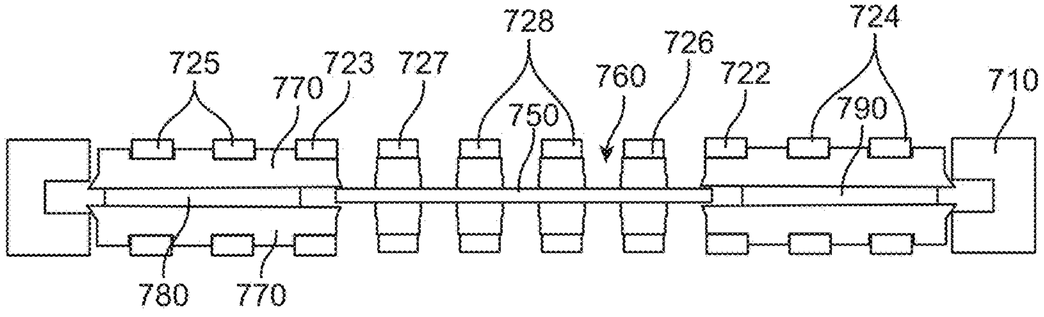

FIG. 7A and FIG. 7B illustrate a tongue for a connector receptacle according to an embodiment of the present invention. Tongue 700 can be used in connector receptacle 112 (shown in FIG. 1), or in other connector receptacles or connector inserts according to embodiments of the present invention. FIG. 7B is a cross-section of tongue 700 in FIG. 7A taken along cutline A-AA. Tongue 700 can include leading edge 702. Tongue 700 can include molded portion 770. Molded portion 770 can be supported by frame 710. Molded portion 770 can support contacts 720. Contacts 720 can include power supply or VBUS contact 722 and VBUS contact 723, transmit differential-pair contacts 724 and receive differential-pair contacts 725, connection-detect contact 726, sideband use contact 727, and USB contacts 728, in accordance with the USB Type-C specification. Frame 710 can serve as a ground contacts on each side of tongue 700. Contacts 720 on the top surface of tongue 700 can be repeated on a bottom surface of tongue 700, again in accordance with the USB Type-C specification. Molded portion 770 can itself be partially over-molded by molded portion 730.

In this example, contacts 720 can be stamped contacts that extend from tongue 700 further into first electronic device 110. This arrangement can make the positioning of a liquid-detect contact different as compared to the arrangement for liquid-detect contact 450 on tongue 400 and liquid-detect contact 650 on tongue 600 above. Accordingly, these and other embodiments of the present invention can include liquid-detect contact 750 in a center of tongue 700, that is, between frame 710, leading edge 702, and ground pad 740, as well as between contacts 720 on a top and bottom surface of tongue 700.

In these and other embodiments of the present invention, one or more passages 760 can be included through molding portions 770. These passages 760 can provide passages for liquids to reach liquid-detect contact 750 so that they can be detected. In these and other embodiments of the present invention, passages 760 can be sufficient in size to avoid the effects of surface tension, which could otherwise prevent liquid from reaching liquid-detect contact 750.

Liquid-detect contact 750 can be formed by dividing a central ground plane into different sections. For example, a central ground plane can be divided into liquid-detect contact 750, ground plane 780, and ground plane 790. Ground plane 780 can help to isolate signals on differential-pair contacts 725 from corresponding contacts (not shown) on a bottom surface of tongue 700. Similarly, ground planes 790 can help to isolate signals on differential-pair contacts 724 from corresponding contacts (not shown) on a bottom surface of tongue 700. These structures are shown further in the following figure.

Figure 8B:
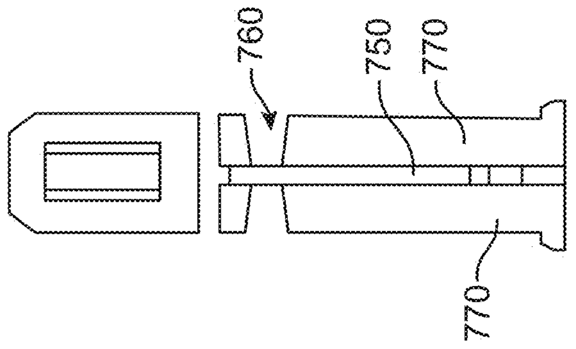
FIG. 8A and FIG. 8B illustrate a connector tongue according to an embodiment of the present invention.
Figure 8A:
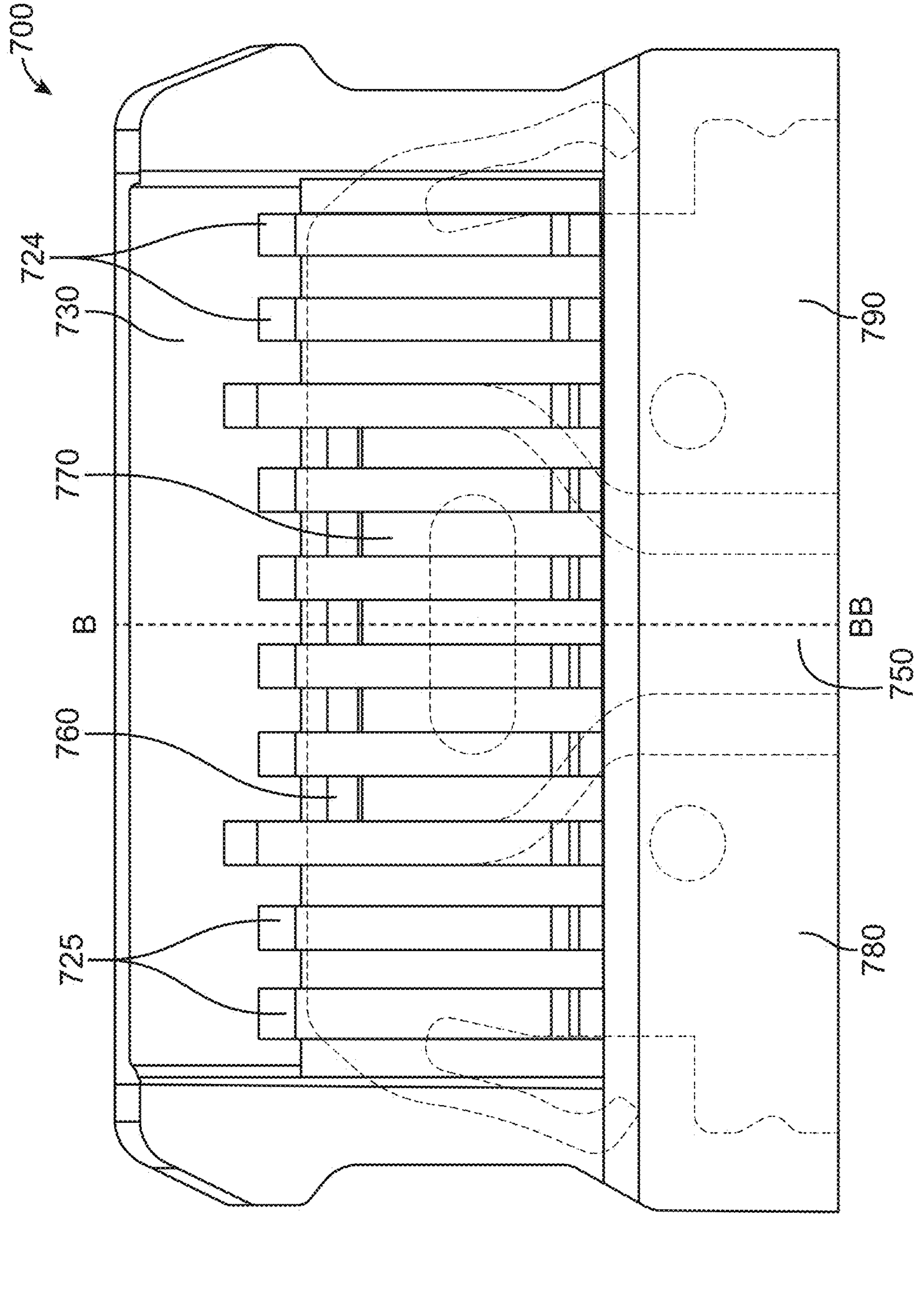

FIG. 8A and FIG. 8B illustrate a tongue of a connector receptacle according to an embodiment of the present invention. FIG. 8B is a cross-section of tongue 700 in FIG. 8A taken along cutline B-BB. In this example, liquid-detect contact 750, ground plane 780, and ground plane 790 are shown. Again, tongue 700 can include molded portion 770 and molded portion 730. Molded portion 730 can be an overmolded portion that is formed over front edges of contacts 720 (shown in FIG. 7A and FIG. 7B.) Passages 760 can extend from a surface of molded portion 770 to a surface of liquid-detect contact 750. Ground plane 780 can help to isolate signals on differential-pair contacts 725 from corresponding contacts (not shown) on a bottom surface of tongue 700. Similarly, ground planes 790 can help to isolate signals on differential-pair contacts 724 from corresponding contacts (not shown) on a bottom surface of tongue 700. Various features, including passages 760, can be repeated on the opposing side of tongue 700.

In these and other embodiments of the present invention, a signal, such as a voltage signal, can be applied to liquid-detect contacts, such as liquid-detect contact 450, liquid-detect contact 650, or liquid-detect contact 750. A resulting current can be measured, and from the magnitude and relative phase of the resulting current, a determination as to the presence of a liquid can be made. In these and other embodiments of the present invention, the voltage signal can be a sinewave. When the voltage signal is a sinewave, electrochemical impedance spectroscopy (EIS) techniques can be used. The sinewave can have a frequency of 90 Hz, 100 Hz, 110 Hz, 120 Hz, 200 Hz, or other frequency.

Alternatively, other voltage signals can be applied to a liquid-detect contact consistent with embodiments of the present invention. For example, pulse waveforms, square-waves, impulse functions, saw-tooth waveforms, and other types of voltage signals can be applied. An example is shown in the following figure.

Figure 9C:
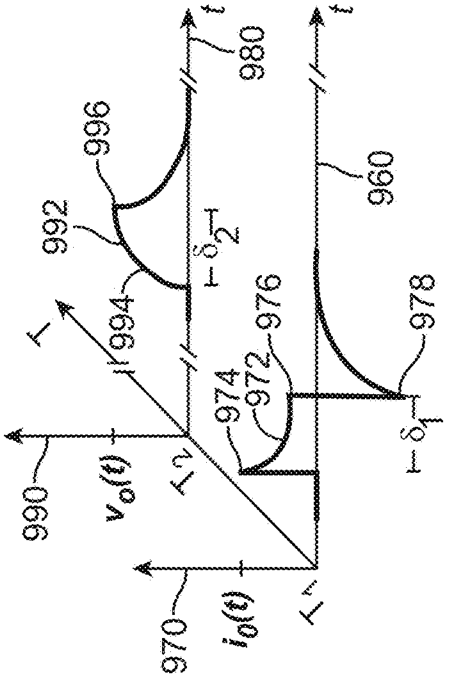
FIG. 9C illustrates possible resulting current and voltage waveforms that can be detected at a liquid-detect contact according to an embodiment of the present invention.
Figure 9B:
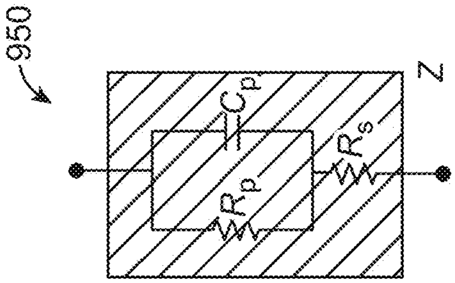
FIG. 9B illustrates a simplified circuit model of a liquid that can be detected by an embodiment of the present invention.
Figure 9A:
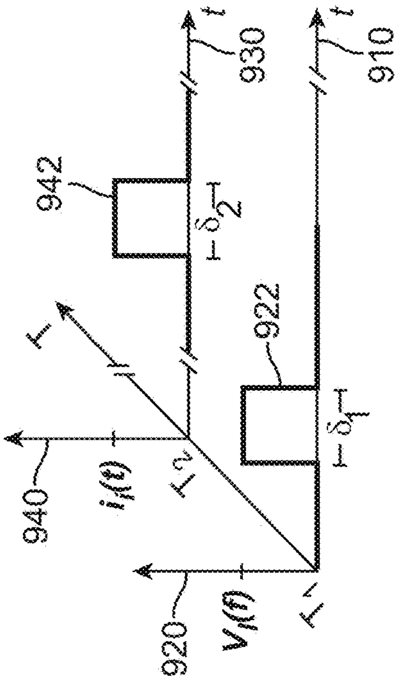
FIG. 9A illustrates a pulse waveform that can be applied to a liquid-detect contact according to an embodiment of the present invention.

FIG. 9A illustrates a pulse waveform that can be applied to a liquid-detect contact according to an embodiment of the present invention. In this example, after an initial time T1, a voltage pulse 922 having a duration $\delta_1$ can be provided as a stimulus, where voltage pulse 922 is shown as a function of voltage amplitude on axis 920 and time on axis 910. A corresponding current pulse 942 can result. In this example, current pulse 942 can similarly have a duration $\delta_1$, and is shown as a function of current on axis 940 and time on axis 930.

FIG. 9B illustrates a simplified circuit model of a liquid that can be detected by an embodiment of the present invention. Simplified circuit model 950 can include a parallel combination of resistor RP and capacitor CP in series with series resistance RS. The absolute and relative values of these components can vary depending on the amount and type of liquid, if any, is present and in contact with a liquid-detect contact, such as liquid-detect contact 450

(shown in FIG. 4), liquid-detect contact 650 (shown in FIG. 6), or liquid-detect contact 750 (shown in FIG. 7A.)

FIG. 9C illustrates possible resulting current and voltage waveforms that can be detected at a liquid-detect contact according to an embodiment of the present invention. In this example, current pulse 972 having a duration $\delta_1$ can be the result of voltage pulse 922 (shown in FIG. 9A) and is shown as a function of current amplitude on axis 970 and time on axis 960. Current pulse 972 can have an overshoot 974 and can settle to a value 976 following an exponential decay. Current pulse 972 can also include undershoot 978, which can settle to zero following an exponential decay. Voltage pulse 922 can have a duration $\delta_1$ and can also be the result of voltage pulse 922 and is shown as a function of voltage amplitude on axis 990 and time on axis 980. Voltage pulse 992 can have a rising edge 994 that follows RC time constant and can reach a peak 996 before decaying to zero.

When pulses are used as a stimulus voltage signal, these various characteristics, such as overshoot 974, rising edge 994, and others, can be used to determine the presence or absence of liquid. When sinewaves are used, various characteristics, such as the amplitude and phase of any resulting current, can be used to determine the presence or absence of liquid. In these and other embodiments of the present invention, the absence, presence, and relative amount of liquid can be determined using these various characteristics. Further, information about the type of liquid can also be determined using these various characteristics. In these and other embodiments of the present invention, different algorithms can use these characteristics when different tongues, such as tongue 400 (shown in FIG. 4) and tongue 700 (shown in FIG. 7) are used.

Figure 10:
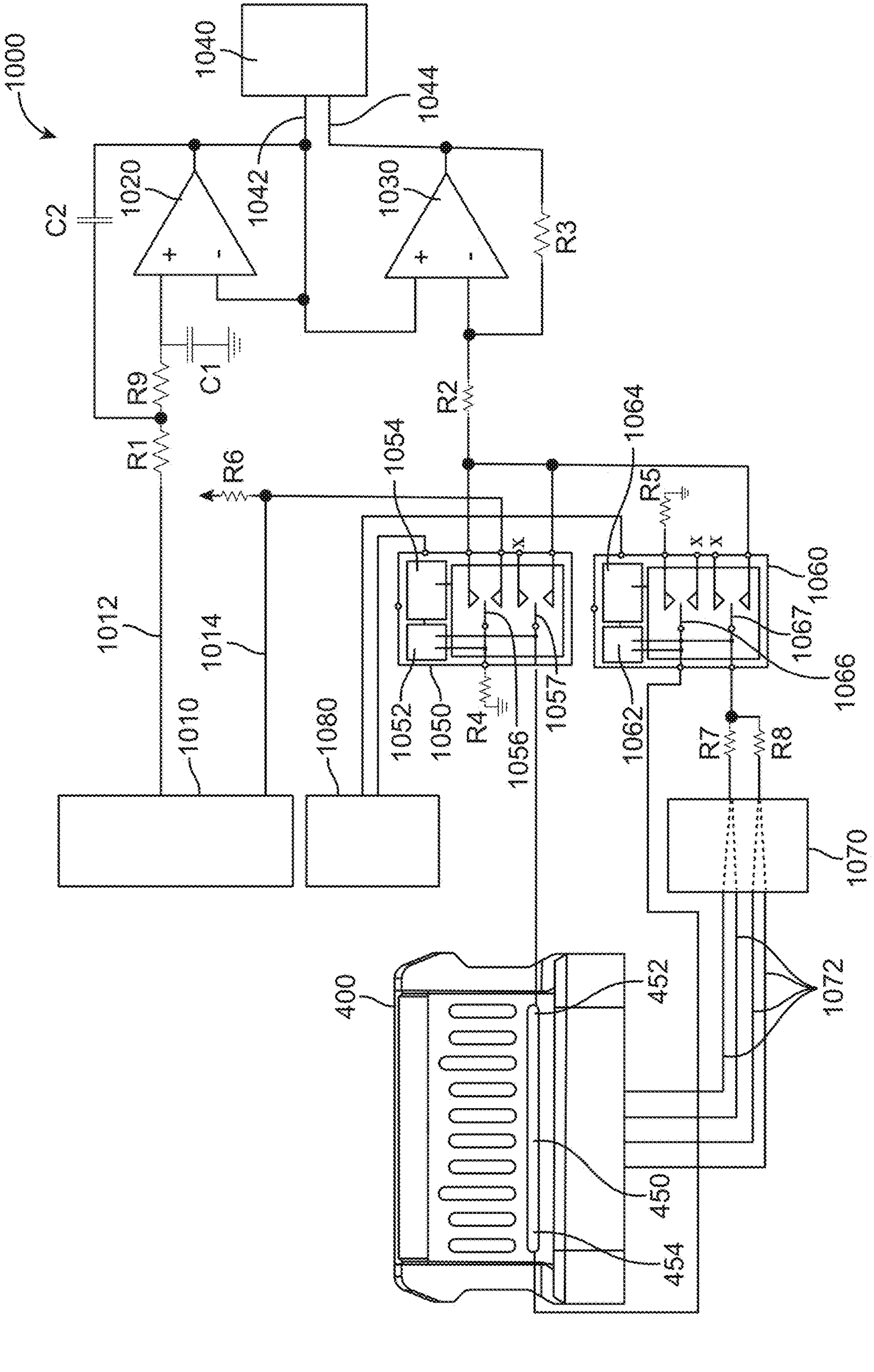
FIG. 10 illustrates a simplified diagram of a liquid-detect circuit according to an embodiment of the present invention.

FIG. 10 illustrates a simplified diagram of a liquid-detect circuit according to an embodiment of the present invention. Liquid-detect circuitry 1000 can perform several tasks. For example, liquid-detect circuitry 1000 can provide a signal to a liquid-detect contact and measure a resulting current. Liquid-detect circuitry 1000 can further perform self-diagnostic tests. These self-diagnostic tests can include a loop-back test and a self-calibration test. In these and other embodiments of the present invention, liquid detection can be performed using other contacts. For example, liquid detection can be performed using USB or SBU contacts.

To perform liquid detection at liquid-detect contact 450, liquid-detect circuitry 1000 can apply a voltage signal to liquid-detect contact 450 and measure a resulting current. Specifically, first logic circuit 1010 can generate a signal on line 1012. First logic circuit 1010 can generate this signal using pulse density modulation (PDM), or other technique. The signal on line 1012 can approximate a sinewave, or can be another type of signal, such as a pulse, a series of pulses, a saw-tooth waveform, or other type of waveform. Alternatively, a DAC (not shown), such as a high-resolution DAC, can be used to generate a sinewave or other type of waveform. Filter amplifier 1020, along with resistors R1 and R9, and capacitors C1 and C2, can filter the waveform on line 1012 to generate a stimulus voltage signal. Filter amplifier 1020 and its associated components can be particularly useful when the signal on line 1012 is a sinewave in order to achieve a desired spectral purity. When the signal on line 1012 is a pulse or other type of waveform, some or all of filter amplifier 1020 and its associated components can be bypassed, for example with a switch (not shown.)

The stimulus voltage signal at the output of filter amplifier 1020 can be provided on line 1042 to analog-to-digital converter 1040. The stimulus voltage signal at the output of filter amplifier 1020 can further be provided to a noninverting input of transimpedance amplifier 1030. In this configuration, the inverting input of transimpedance amplifier 1030 can track the noninverting input of transimpedance amplifier 1030, thereby tracking the stimulus voltage signal at the output voltage of filter amplifier 1020. This tracking signal voltage can be applied through resistor R2 and switch 1057 to liquid-detect contact 450 at location 452 as the applied signal voltage. Current flow into liquid-detect contact 450 can be provided through input resistor R2 and feedback resistor R3 of transimpedance amplifier 1030. This can generate a measured voltage signal at the output of transimpedance amplifier 1030 on line 1044. This measured voltage signal is thus reflective of the current flowing through liquid-detect contact 450. This measured voltage signal can be converted by analog-to-digital converter 1040.

In this way, analog-to-digital converter 1040 can sample a stimulus voltage signal on line 1042. Analog-to-digital converter 1040 can further sample a measured voltage signal on line 1044 that tracks a current flowing through liquid-detect contact 450. In this way, the magnitude of the current flowing through liquid-detect contact 450 and its phase relationship to the stimulus voltage signal on line 1042 can be determined. This information can this be used to determine the presence of liquid in connector receptacle 112 (shown in FIG. 1) that houses tongue 400.

In these and other embodiments of the present invention, various mitigation strategies can be taken in response to the detection of a liquid in or on a connector. For example, a user can be alerted that liquid is present on tongue 400 and that first electronic device 110 (shown in FIG. 1) should be powered down. A user can be alerted that first electronic device 110 is powering down and then first electronic device 110 can power down. First electronic device 110 can power down following the detection of the presence of liquid. Liquid ejection or cleaning techniques can be undertaken by the device or suggested to the user. Circuitry connected to one or more contacts 420 (shown in FIG. 4) can be disconnected.

Liquid detection can occur at various times. For example, liquid-detect measurements can occur continuously. Liquid-detect measurements can occur continuously when a device is being used. Liquid-detect measurements can occur periodically whether or not the device is being used. Liquid-detect measurements can occur periodically when the device is being used. Liquid-detect measurements can occur following an event, such as a fall that is detected using an accelerometer in the device. Liquid-detect measurements can occur following a power-up of the device. Liquid-detect measurements can occur following the start of a power-down of the device. Liquid-detect measurements can occur at any combination of these or other times.

When liquid-detect measurements are occurring, switch 1056 can connect resistor R4 to resistor R6 via line 1014. In this way, resistor R4 can pull down the voltage on line 1014, and in response first logic circuit 1010 can determine that measurements are taking place. Also in this state, switch 1057 can connect R2 to liquid-detect contact 450 at location 452. Switch 1066 can connect location 454 of liquid-detect contact 450 to an open circuit. Similarly, resistor R7 and resistor R8 can be connected to an open circuit through switch 1067.

In these and other embodiments of the present invention, it can be desirable to ensure that liquid-detect circuitry 1000 is correctly connected to liquid-detect contact 450 on tongue 400. If an inadvertent disconnection were to occur, the presence of a liquid at liquid-detect contact 450 went go undetected. Accordingly, embodiments of the present invention can provide a loopback path to determine that the necessary connections for liquid detection are intact.

During a loopback path test, a voltage can again be applied through resistor R2 to liquid-detect contact 450 at location 452. Location 454 of liquid-detect contact 450 can be connected to location 452 through liquid-detect contact 450 and can be connected through switch 1066 to resistor R5. Resistor R5 can be a resistor having a known value and a known temperature coefficient. Resistor R5 can draw an expected current through resistors R2 and R3 of transimpedance amplifier 1030. When the expected current (given the circuit's temperature) is measured, it can be determined that the liquid-detect circuitry is correctly connected to liquid-detect contact 450. While tongue 400 is shown in this example, other tongues, such as tongue 600 (shown in FIG. 6) and tongue 700 (shown in FIG. 7), can be similarly used with liquid-detect circuitry 1000.

In these and other embodiments of the present invention, it can be desirable to calibrate the liquid-detect circuitry. During calibration, resistor R4 can be connected to input resistor R2 through switch 1056. Resistor R4 can be a known resistor having a known temperature coefficient. This known resistor can draw a current that can be measured and compared to an expected current, given the circuit's temperature. The liquid detection circuitry can be calibrated based on this comparison.

In these and other embodiments of the present invention, it can be desirable to perform liquid detection at other contacts. To do so, resistor R2 can be connected to resistors R7 and R8 through switch 1067. Resistors R7 and R8 can be further connected either to USB contacts 428 or SBU contacts 427 through multiplexer 1070. In this configuration, resistor R2 can be disconnected from liquid-detect contact 450 by switch 1057.

In these and other embodiments of the present invention, switch 1056 and switch 1057 in multiplexer 1050 can be controlled by logic 1054. Similarly, switch 1066 and switch 1067 in multiplexer 1060 can be controlled by logic 1064. Logic 1054 and logic 1064 can be controlled by second logic circuit 1080.

In these and other embodiments of the present invention, various contacts, such as liquid-detect contact 450, can be exposed to overvoltage conditions. When an overvoltage condition is detected, these contacts can be disconnected from the liquid-detect circuitry. For example, an overvoltage condition at switch 1056 or switch 1057 in multiplexer 1050 can be detected by overvoltage circuitry 1052. Overvoltage circuitry 1052 can then respond accordingly. For example, overvoltage circuitry 1052 can connect liquid-detect contact 450 to an open circuit via switch 1057. Similarly, an overvoltage condition at switch 1066 or switch 1067 in multiplexer 1060 can be detected by overvoltage circuitry 1062. Overvoltage circuitry 1062 can then respond accordingly. For example, switch 1066 in multiplexer 1060 can connect liquid-detect contact 450 to an open circuit via switch 1066. Lines 1072 can be connected to an open circuit via switch 1067. In these and other embodiments of the present invention, multiplexer 1050 and multiplexer 1060 can connect their respective switches to other circuit nodes or open circuits following the detection of an overvoltage condition.

Embodiments of the present invention can provide liquid detection for various types of devices, such as portable computing devices, tablet computers, desktop computers, laptops, all-in-one computers, wearable computing devices, audio devices, cell phones, smart phones, media phones, storage devices, portable media players, navigation systems, monitors, power supplies, video delivery systems, adapters, remote control devices, chargers, and other devices. The liquid detection can be done in various types of connectors. These connectors can provide pathways for power and signals that are compliant with various standards such as one of the Universal Serial Bus (USB) standards including USB Type-C, High High-Definition Multimedia Interface® (HDMI), Digital Visual Interface (DVI), Ethernet, DisplayPort, Thunderbolt™, Lightning®, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector comprising:

a tongue;

a plurality of contacts having contacting surfaces on the tongue, each of the plurality of contacts to form physical and electrical connections with a corresponding contact in a corresponding connector when the connector is mated with a corresponding connector;

a first contact to remain disconnected from any contact in the corresponding connector when the connector is mated with the corresponding connector;

a second contact to mate with a corresponding contact when the connector is mated with the corresponding connector, the second contact coupled to ground through a series combination of a switch and a resistor; and a liquid-detect circuit coupled to the first contact and the second contact, wherein the liquid-detect circuit uses the first contact and the second contact to determine a presence of liquid on the tongue, and when liquid is detected on the tongue, the switch is opened and when liquid is not detected on the tongue, the switch is closed coupling the second contact to ground through the resistor.

2. The connector of claim 1 wherein the first contact is a liquid-detect contact and the second contact is a connection detection contact.

3. The connector of claim 2 wherein the liquid-detect contact is located on the tongue.

4. The connector of claim 3 wherein the connection detection contact is located on the tongue.

5. The connector of claim 4 wherein the resistor is connected directly to ground.

6. The connector of claim 5 wherein the tongue is formed of a printed circuit board.

7. The connector of claim 5 wherein the tongue is formed of plastic.

8. The connector of claim 1 wherein the first contact is positioned between two contacts in the plurality of contacts.

9. A connector comprising:

a tongue;

a plurality of contacts having contacting surfaces on the tongue, each of the plurality of contacts to form physical and electrical connections with a corresponding contact in a corresponding connector when the connector is mated with a corresponding connector;

a first contact to remain disconnected from any contact in the corresponding connector when the connector is mated with the corresponding connector;

a second contact to mate with a corresponding contact when the connector is mated with the corresponding connector; and a liquid-detect circuit coupled to the first contact and the second contact, wherein the liquid-detect circuit provides a square-wave voltage pulse to a drive circuit having an output coupled to the first contact, measures an output voltage at the first contact, and measures a resulting current at the second contact.

10. The connector of claim 9 wherein the liquid-detect circuit measures the resulting current at the second contact by converting the resulting current to a resulting voltage and measuring the resulting voltage.

11. The connector of claim 10 wherein the liquid-detect circuit further determines an overshoot of the resulting current.

12. The connector of claim 11 wherein the liquid-detect circuit further determines a rise time of the output voltage at the first contact.

13. The connector of claim 12 wherein the liquid-detect circuit converts the resulting current to a resulting voltage using a transimpedance amplifier.

14. The connector of claim 12 wherein the liquid-detect circuit further determines a presence of a liquid using the overshoot of the resulting current and the rise time of the resulting voltage.

15. The connector of claim 9 wherein the liquid-detect circuit further determines a presence of a liquid using characteristics of the resulting current and characteristics of the output voltage.

16. The connector of claim 9 wherein the drive circuit comprises an amplifier.

17. A connector comprising:

a tongue having a top side;

a plurality of contacts having contacting surfaces on the top side of the tongue, each of the plurality of contacts to form physical and electrical connections with a corresponding contact in a corresponding connector when the connector is mated with a corresponding connector;

a first contact on the top side of the tongue;

a second contact on the top side of the tongue;

a third contact on the top side of the tongue;

a solder mask layer selectively formed on the top side of the tongue, wherein the solder mask layer is formed between the first contact and the second contact on the top side of the tongue and is absent between the second contact and the third contact on the top side of the tongue;

a ground pad positioned such that the plurality of contacts are between the ground pad and a leading edge of the tongue; and a liquid-detect contact between the plurality of contacts and the ground pad.

18. The connector of claim 17 wherein the solder mask layer is further formed between the plurality of contacts and the ground pad.

19. The connector of claim 18 wherein the solder mask layer forms a raised portion between the first contact and the second contact.

* * * * *